Aug. 14, 1923.

A. E. BERTELSON 1,464,636

MEANS FOR OBTAINING SPHERICAL RELIEF IN PICTURES

Filed Nov. 28, 1921

INVENTOR
A. E. Bertelson.
BY
ATTORNEYS

Patented Aug. 14, 1923.

1,464,630

UNITED STATES PATENT OFFICE.

AXEL E. BERTELSON, OF CHICAGO, ILLINOIS.

MEANS FOR OBTAINING SPHERICAL RELIEF IN PICTURES.

Application filed November 28, 1921. Serial No. 518,320.

*To all whom it may concern:*

Be it known that I, AXEL E. BERTELSON, a citizen of the United States, and a resident of Chicago, in the county of Cook and State of Illinois, have invented a new and useful Improvement in Means for Obtaining Spherical Relief in Pictures, of which the following is a full, clear, and exact description.

My invention relates to improvements in means for obtaining spherical relief in pictures, and it consists in the combinations, constructions and arrangement herein described and claimed:

An object of my invention is to provide a device of the character described, in which a picture drawn upon a flat surface having two dimensions may be viewed through a transparent plate and given the appearance of a picture having three dimensions, the third dimension representing depth.

A further object of my invention is to provide a device of the character described, in which concave cylindrical lenses are employed of varying powers to produce virtual images of a transcription which appear to have depth dependent upon the power of the lens.

Other objects and advantages will appear in the following specification, and the novel features of the invention will be particularly pointed out in the appended claims.

Figures 1, 2:
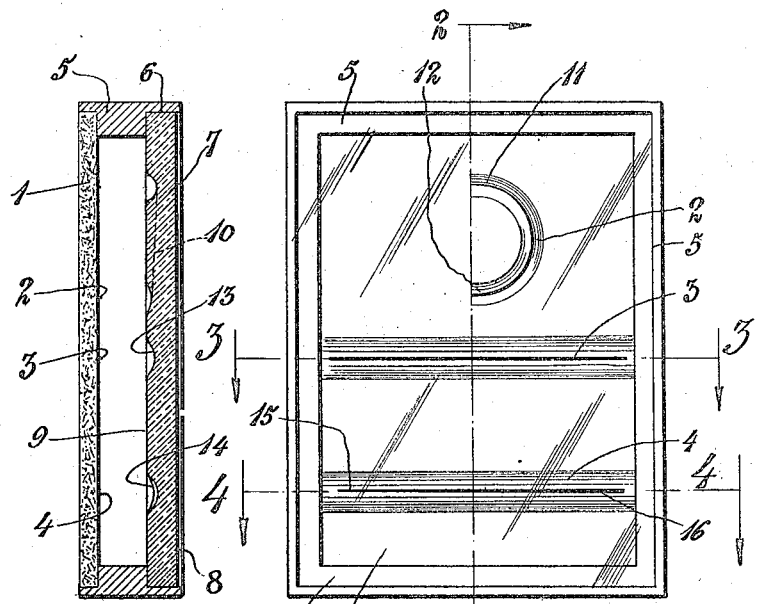
Figure 3:
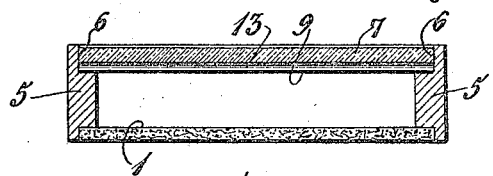
Figure 4:
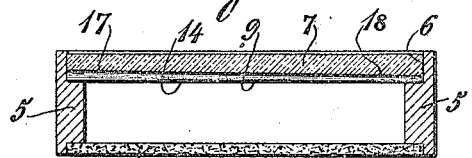

My invention is illustrated in the accompanying drawings, forming part of this application, in which Fig. 1 is a front elevation of an embodiment of my invention, Fig. 2 is a sectional view along the line 2—2 of Fig. 1, Fig. 3 is a sectional view along the line 3—3 of Fig. 1, Fig. 4 is a sectional view along the line 4—4 of Fig. 1.

In carrying out my invention, I make use of a substantially flat screen 1 of card-board or any other suitable material. The screen 1 is preferably black and is adapted to have figures such as represented by the lines 2, 3 and 4 drawn thereon. These figures are drawn with single lines, either in white or in colors. No shading is used.

The screen 1 is provided with a substantially quadrangular frame 5, which encompasses the perimeter of the screen and is provided with recesses 6 in the side walls thereof, adapted to receive a glass lens member 7.

The lens member 7 is disposed in substantially parallel relation to the screen 1 and has one surface 8 which is plane. The opposite surface 9 is provided with arcuate grooves corresponding axially with every line drawn upon the screen 1, i. e., the lines 2, 3 and 4. The axial lines of the groove must be in exact registration with the lines drawn on the screen 1. It is well known in optical science that a concave lens will produce a virtual image and that the apparent position of that image will depend upon the power of the lens, i. e., if the cuvature of the depression of the lens is great, the image will appear to be far away, but if the curvature is only slight, the image will appear to be relatively near.

It will thus be seen that if the line 2 is drawn as it is shown in Fig. 1 as a curved line, and that if the corresponding groove in the lens 7 is varied in its depth, as will be seen in the sectional view 2 and the dotted line 10 that this gradual increasing of the depth of the groove produces a concave cylindrical lens which gradually varies in power as the depth of the groove changes. Therefore, the curved line 2 will not appear as merely a curved line, but one end, in this case, the end 11, will appear to be farther away from the observer than the end 12, simply because the power of the concave cylinder over the end 11 is greater than the power of the concave cylinder above the end 12. To further illustrate this property, I have provided the line 3 over which is a groove 13. The groove 13 is constant in its depth, as may be seen by reference to Fig. 3. The line seen by the observer will appear therefore to be in a flat plane. The line 4, however, has in registration therewith a groove 14. The groove 14, as reference to Fig. 4 will show, varies in depth and therefore the line 4 will appear to be farther away at its end 15 than at its end 16, since the groove 14 is deeper at its end 17 than at its end 18. The power of the concave cylindrical lens is greater at its end 17 than at its end 18.

From the foregoing description of the various parts of the device, the operation thereof may be readily understood. Pictures of objects may be drawn upon the screen 1 in lines of uniform thickness and the lens 7 prepared with grooves corresponding and in register with the lines drawn upon the screen 1. If depth is required in any of the lines, it is merely necessary to provide a groove in the surface 9 of the lens 7 of sufficient depth to obtain the required result. Relative depth of lines one to another may be had by proportionally varying the depth of the respective corresponding grooves.

I claim:

1. The combination with a flat screen having a line drawn thereupon, of a substantially flat transparent plate mounted parallel to said screen, said plate having an arcuate groove in one surface thereof having its axis in registration with said line on said screen, the curvature of said arcuate groove being variable throughout its length, thereby providing a concave cylindrical lens of varying power to produce a differentially magnified virtual image of the different portions of said line to cause certain portions of said line to appear at different distances from the observer.

2. The combination with a flat screen having a pictorial illustration drawn thereupon, of a substantially flat glass plate mounted in parallel relation to said screen, said glass plate having a plurality of arcuate grooves in one surface thereof, having their axial lines in registration with the lines of the illustration on said screen, said concave cylindrical lenses so formed being of different powers dependent upon the depth of the groove and therefore producing differently magnified virtual images of the lines of said illustration to cause said lines to appear at different distances from the observer.

AXEL E. BERTELSON.